United States Patent Office 3,318,487
Patented May 9, 1967

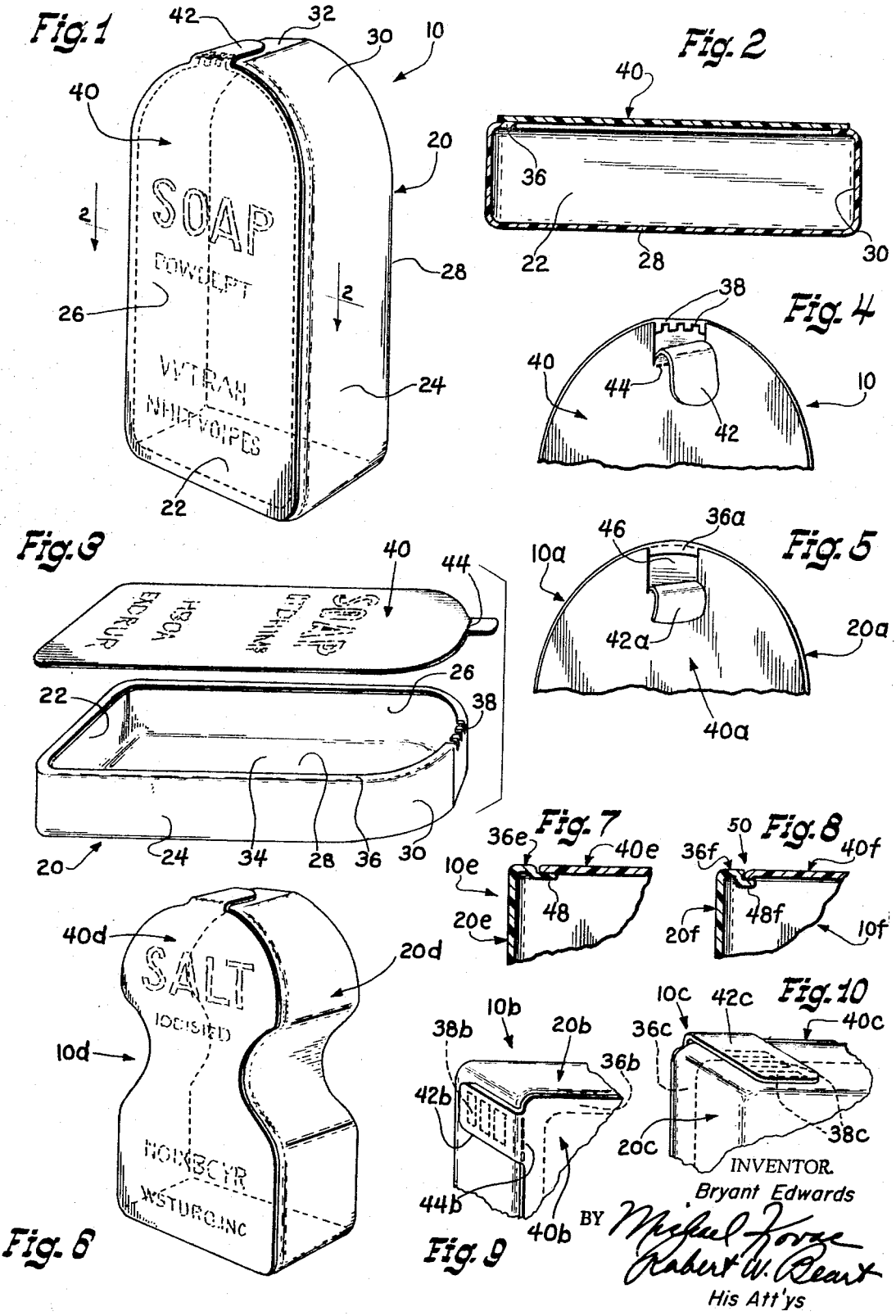

3,318,487
COMPOSITE PACKAGE
Bryant Edwards, Clarendon Hills, Ill., assignor to Illinois Tool Works Inc., Chicago, Ill., a corporation of Delaware
Filed June 28, 1965, Ser. No. 467,314
7 Claims. (Cl. 222—173)

The present invention relates to a novel composite package, and more particularly, to an elongated thermoplastic container body with a suitable panel element therefor.

Container packages which are relatively tall, but shallow, that is, where the vertical height substantially exceeds the depth thereof, have been used with great commercial success for dry cereal, soap powder and the like. Such packages are commonly of the one-piece foldable paperboard carton variety which have gained wide acceptance primarily because they can be inexpensively produced. In recent years, thermoplastic materials such as polystyrene, polyethylene, etc. are being used in increasing numbers for a variety of products because they cannot only compete, in certain instances, with paperboard products, but they also possess distinct advantages thereover. The most notable examples are the now well-known vending cups which can be manufactured to compete from a price standpoint with paper products, and yet present a better feel and taste to the lips of users, do not become soggy in use, and provide a moisture vapor barrier.

Material and equipment expense have made tall, shallow thermoplastic containers of the aforementioned type expensive to produce, and even where they have been produced, inherent difficulties such as material distribution are encountered as container depth is increased. Limitations have also been imposed on container designs such as where it is desired to have unusual side wall contour effects, and it has become necessary to apply a preprinted band or label to the container for identification and advertising purposes. All of this points up the relative difficulty with which the thermoplastic containers have had in attempting to enter the dry product market.

Accordingly, it is an object of the present invention to provide a novel composite container package for tall, shallow containers which overcomes the above noted deficiencies.

More specifically, it is an object of the present invention to provide a composite package which is economical to produce from both a material and machinery standpoint so as to be capable of readily competing with paperboard products similar in nature.

Another object of the present invention is to provide a strong composite package which is configured to protect or cushion its contents, and which is not itself affected by humidity or other adverse effects.

A further object of the present invention is to provide a tall, shallow composite package which has unusual billboard characteristics capable of being readily displayed to consumers while sitting upright on a store shelf so as to save space.

Still another object of the present invention is to provide a composite package which, in addition to the aforementioned objects, is capable of being formed with unusual side wall contour effects, and readily accommodates a wide variety of panel elements.

These and other objects and advantages are provided by a composite package having a vertical height substantially greater than either the width or depth thereof and including an elongated thermoplastic container body having a substantially vertically extending open face portion about which a panel element of the type capable of being printed is secured, and opening means provided in the package to permit egress of the contents thereof.

In the drawings:

FIG. 1 is a perspective view of one form of composite package embodying the features of my invention;

FIG. 2 is a sectional view of the package shown in FIG. 1 as viewed along line 2—2 thereof;

FIG. 3 is an exploded perspective view of the composite package shown in FIG. 1;

FIG. 4 is a fragmentary side elevational view of the package shown in FIG. 1 with the panel tear tab stripped away;

FIG. 5 is a fragmentary elevational view of a composite package similar to that shown in FIG. 1 with a modified package opening means;

FIG. 6 is a perspective view of another form of composite package coming within the purview of the present invention;

FIG. 7 is a fragmentary sectional view of a modified panel and container body construction adapted for use in any of the composite packages coming within the scope of the present invention;

FIG. 8 is also a fragmentary sectional view of another way in which a panel-container body construction can be secured together to form composite packages in accordance with the present invention; and FIGS. 9–10 are fragmentary perspective views of modified panel tear tabs which may be employed in the composite packages of the present invention.

Referring now in greater particularity to the drawings, and first to the form of invention shown in FIGS. 1–4, there will be seen a composite package 10 including an elongated container body 20 and a panel element 40. The composite package has a vertical height substantially greater than either its width or depth, and in the usual case, this will mean that the vertical height is on the order of from 2–4 times greater than its depth and width. It will be understood that this is to be considered in an exemplary sense only, and is not to be construed as the only possible range of vertical height to width and depth contemplated by the present invention.

The elongated container body 20 is formed from thermoplastic sheet stock material, preferably impact polystyrene, into a one-piece container body of seamless construction. The fabrication technique by which thermoplastic container bodies are preferably formed is commonly known as the thermoforming technique which employs mechanical and/or pressure means to form container bodies from a heated web or sheet of thermoplastic material. The container body 20 is particularly well suited to this technique since it can be formed on its side without requiring deep or unusually large draw ratios. Relatively tall containers such as those contemplated by the present invention, if formed conventionally with a bottom wall and a peripherally continuous side wall extending upwardly therefrom, might have undesirable thinning or weak spots which can be obviated only by employing additional equipment, and this increases both the expense and the container forming cycle which is obviously undesirable. By producing container bodies on their sides so as to eliminate draw ratio difficulties, container bodies of relatively uniform wall thickness can be produced in an economical manner.

As shown in FIG. 1 of the drawings, the elongated container body 20 has a polygonally shaped bottom wall 22 generally rectangular in configuration, a pair of generally opposed side walls 24, 26 and an intermediate side wall portion 28 which forms the rear face of the package 10, the side walls 24, 26 and 28 being joined to each other in the vicinity of the curvilinear top wall 30. The generally opposed side walls 24, 26 are substantially parallel to each other for a major portion of their length, and are provided with curved upper end portions which converge toward each other to form the top wall 30. A generally centrally positioned flat 32 is formed in the top wall 30 substantially equidistant from the generally opposed side walls 24, 26 to provide a surface against which the tear tab or flap of the closure element can rest as will be subsequently explained. The bottom wall 22 is provided with a surface area of sufficient size so as to be capable of supporting the elongated container body in an upright position for reasons which will become more apparent hereinafter.

The container body 20 has an open face portion 34 as best seen in FIG. 3 which, in its upright or erect position as seen in FIG. 1 becomes a vertically extending open face. The material portions which are adjacent to and surround this open face define a peripherally extending flange 36 which is inwardly directed or laterally inwardly offset from the outer margins of the container body. If desired, a series of dispensing apertures 38 may be formed in the peripherally extending flange 36 adjacent the top wall 30 for reasons which will subsequently appear.

The inwardly directed, peripherally extending flange 36 provides a suitable area to which a panel element 40 may be united. The panel element 40 which is substantially planar in form, is of the type capable of receiving printed indicia, and thus can either be made from paperboard, thermoplastic materials, or a combination of both. The panel element 40 after being suitably formed is printed with desired advertising or identifying literature, and then is applied to the container body 30 after the latter has been filled with the desired product.

Various approaches can be used in uniting the panel element to the peripherally extending flange 36 of the container body including the use of adhesives, heat sealing techniques, and even resilient interengaging fastening means, the latter being shown in FIG. 8 of the drawings. In the preferred form of the invention, the panel element is either adhesively secured or heat sealed to the peripherally extending flange 36 of the container body 20.

The panel element 40, when printed and secured to the peripherally extending flange 36 of the container body 20, provides an excellent billboard which can be displayed to consumers when the composite package 10 is positioned upright as shown in FIG. 1 on a supporting surface such as a store shelf. This will enable the consumer to rapidly identify the product, and at the same time save shelf space while creating the image of a large container as is the case with tall, shallow containers when resting on the bottom wall thereof.

Removal of the contents from the package shown in FIGS. 1–4 can be easily effected by separating the tear tab 42 from the container body 20 and moving it to a position where it does not overlie the dispensing apertures 38. The tear tab 42 is united to the container body in the vicinity of the centrally positioned flat 32 by methods heretofore discussed. It will be appreciated that the centrally positioned flat 32 enables the tear tab 42 to rest thereagainst without bowing or buckling. When the tear tab 42 has been moved to a position away from the dispensing apertures 38 as best seen in FIG. 4, the package 10 may be then tilted in the usual manner to move the contents thereof toward and through the dispensing apertures 38. If desired, a line of perforations 44 may be provided in the closure element 40 just below the lower extremities of the dispensing apertures 38 such that the tear tab can be separated from the panel element after being moved to a position below the dispensing apertures 38. If desired, the tear tab 42 may remain attached to the panel element 40, and have a suitable coating on the underface thereof such that it can be repeatedly used as a cover flap for the dispensing apertures.

It is to be understood that the form of the invention shown in FIGS. 1–4 is merely illustrative of one type of composite package, and that various modifications in the opening means, method of uniting the panel and container, and the shape of the container may be made within the scope of the present invention. Various examples have been depicted in the drawing to indicate the type of modifications that are possible. It is to be understood that the modifications shown are merely representative of the type of changes that may be made while still employing the basic teachings of the present invention.

In the form of the invention shown in FIG. 5, for example, the package 10a is identical, with one exception, to the package 10 as indicated by the application of identical reference numerals with the suffix "a." This exception is the package opening means which comprises cooperating parts of the container body and panel element designated 20a, 40a respectively. In particular, it will be seen that the removable tear tab here designated 42a is not designed to overlie the top wall of the container body, but rather is designed to have its uppermost area engage a portion of the peripherally extending flange as indicated by the phantom lines prior to the package being opened, and then is capable of being moved inwardly of and below the peripherally extending flange 36a as seen in FIG. 5 to expose the relatively large dispensing aperture 46. The tear tab 42a may then be permanently separated from the package or have its undersurface coated with a suitable adhesive to permit subsequent reapplication to the peripherally extending flange 36a just as in the FIGS. 1–4 embodiment.

Modified forms of package opening means are also shown in FIGS. 9–10. The packages designated 10b and 10c in FIGS. 9 and 10 respectively are generally similar to FIGS. 1–4 embodiment as indicated by the application of identical reference numerals with the suffixes "b" and "c" used to designate like parts in the respective figures. The parts of the packages 10b, 10c shown in these two figures indicates that the package is generally rectangular in shape, rather than having a curvilinear upper portion as in the FIGS. 1–4 embodiment. As seen in FIG. 9, the tear tab or flap 42b is adapted to overlie dispensing apertures 38b provided in one of the side walls of the container body 20b, while the tear tab 42c shown in FIG. 10 overlies dispensing apertures 38c formed in the top wall of the container 20c. In either or both of the packages 10b, 10c, a series of perforations such as 44b in FIG. 9 may be provided so as to effectuate permanent removal of a tear tab from its respective panel element when the package is opened, or a suitable reapplying adhesive may be coated on the underface of the tear tab in the same manner and for the same purpose as the other embodiments.

Insofar as the shape of the package is concerned, it will be apparent that various designs are possible. The package shown in FIG. 6 of the drawings and identified 10d is similar to the other described embodiments as indicated by the application of identical reference numerals with the suffix "d" used to designate like parts. Upon an inspection of this figure, it will be readily apparent that the only material difference between the container shown and the one illustrated in FIG. 1 is the side wall contour effect that has been produced so as to provide a container generally having the shape of a figure 8. This particular design will, of course, facilitate gripping of the package in the mid portion thereof, but the same effect can be achieved by blending other designs of delicate curves as will readily come to the mind of a designer. The freedom of design that is available with the package of the present invention is an added factor to an economical package construction which is limited only by the desires of the manufacturer and consumers.

While the panel element in the preferred form of the invention overlies the peripherally extending flange of the container body, there may be instances where it is desired to mount the closure element in flush relationship to the outermost material portions surrounding the open face of the container body. The part of the package 10e shown in FIG. 7 is identical with the other embodiments as indicated by the application of like reference numerals with the suffix "e" used to designate like parts. In the package 10e, a shelf portion 48 is provided, and is inwardly offset from outermost material portions adjacent the open face of the container body 20e by a distance corresponding to the thickness of the panel element 40e so as to permit mounting of the closure element in flush relationship to the outermost material portions of the container as will be apparent.

Generally similar to, but a slight modification of the embodiment shown in FIG. 7 is the part of the package 10f shown in FIG. 8 of the drawings which is generally similar to the above discussed embodiments as indicated by the application of identical reference numerals with the suffix "f" employed to designate like parts. As is the case with the FIG. 7 embodiment, the panel element 40f of the FIG. 8 embodiment is mounted on the shelf portion 48f so as to mount the closure element in flush relationship to material portions surrounding the open face of the container body 20e. In addition to this, the package 10f is provided with complementary interlocking fastening means 50 which may take various forms, but is here shown as an undercut surface adjacent the shelf portion 48f which engages the outer peripheral surface of the closure element 40f to maintain the same in assembled relationship to the container body 20f. In this manner, the container body and the panel element designated 20f, 40f respectively will be releasably united or secured to one another.

From the foregoing, it will now be apparent that the composite package of the present invention provides a sturdy, economical receptacle which can be manufactured and assembled without great difficulty, and yet which can accommodate a wide variety of package designs and panel elements. In addition, large printing areas are provided so as to give excellent billboard characteristics to the composite package of the present invention.

Although specific embodiments of the invention have been shown and described, it is with full awareness that many modifications thereof are possible. The invention is thus not to be restricted except insofar as is necessitated by the prior art and by the spirit of the appended claims.

I claim:

1. A composite package comprising an elongated container body of polygonal transverse cross section and having one open side, said container body having a vertical height substantially greater than either the width or depth thereof and including a supporting base portion extending substantially normal to said one open side and having a surface area of sufficient size so as to be capable of supporting said elongated container body in an upright position, a peripherally extending and substantially circumferentially continuous flange integrally joined to and inwardly directed from material portions adjacent the periphery of the one open side for a relatively small distance in proportion to the extent of the opening of the one open side, a panel element substantially coextensive with and resting upon the peripherally extending and substantially circumferentially continuous flange and being joined thereto by sealing means, and opening means provided in said composite pacgage to permit egress of the contents thereof.

2. The composite package as set forth in claim 1 wherein said opening means comprises a removable tear tab at least initially overlying dispensing apertures provided in said elongated container body.

3. The composite package as set forth in claim 1 wherein said dispensing apertures are provided in the side wall of said elongated container body.

4. The composite package as set forth in claim 1 wherein said dispensing apertures are provided in the top wall of said elongated container body.

5. The composite package as set forth in claim 1 wherein said dispensing apertures are provided in the peripherally extending inwardly directed flange of said elongated container body.

6. The composite package as set forth in claim 1 wherein at least generally opposed portions of the side walls are curvilinear in form and merge in the vicinity in the top wall of said container body.

7. A composite package comprising an elongated container body and an attached panel element therefor, said elongated body having a one piece, seamless construction formed from thermoplastic sheet stock material, said container body having a vertical height substantially greater than either the width or depth thereof and including bottom, side and top walls, said bottom wall having a polygonal configuration of sufficient surface area so as to be capable of supporting said elongated container body in an upright position, said side wall being circumferentially uninterrupted between the top and bottom walls of said elongated container body for substantially the entire width thereof to present in cross section a generally U-shaped configuration and defining a substantially vertically extending open face traversing the outer free extremities thereof, a peripherally extending flange integrally joined to the outer free extremities of said U-shaped side wall adjacent the vertically extending open face and being laterally inwardly offset therefrom, said panel element being generally planar in form and of the type capable of being preprinted, said panel element being secured to the peripherally extending inwardly directed flange of said elongated container body subsequent to the filling thereof, and opening means provided in said package to permit the egress of its contents including a removable tear tab joined to said panel element and overlying dispensing apertures provided in said container body.

References Cited by the Examiner

UNITED STATES PATENTS

| | | | |
|---|---|---|---|
| 506,982 | 10/1893 | Diamond | 222—541 |
| 1,871,907 | 8/1932 | Olt | 222—43 |
| 2,283,547 | 5/1942 | Ford | 222—541 X |
| 2,737,336 | 3/1956 | Moore | 229—43 |
| 2,750,093 | 6/1956 | Moore | 229—5.5 |
| 2,753,088 | 7/1956 | Prahl | 222—215 X |
| 2,776,787 | 1/1957 | Nicol | 222—565 |
| 2,788,642 | 4/1957 | Burkhead et al. | 222—173 X |
| 2,795,357 | 6/1957 | Burton et al. | 222—173 |
| 2,857,080 | 10/1958 | Elias | 222—215 X |
| 2,880,859 | 4/1959 | Tupper | 150—0.5 X |
| 2,898,003 | 8/1959 | Wilson et al. | 222—107 |
| 2,898,015 | 8/1959 | Borah | 222—541 |
| 2,911,664 | 11/1959 | Zecchini | 222—541 |
| 2,940,654 | 6/1960 | Easter | 229—43 |
| 3,023,938 | 3/1962 | Johnson | 222—478 |
| 3,101,870 | 8/1963 | Betner | 150—0.5 X |
| 3,133,689 | 5/1964 | Rossi | 229—17 |
| 3,139,646 | 7/1964 | Vernon | 222—541 X |
| 3,154,225 | 10/1964 | Wadlinger et al. | 222—565 X |
| 3,160,334 | 12/1964 | Howe | 222—565 X |
| 3,167,104 | 1/1965 | Wiley et al. | 229—2.5 X |
| 3,168,222 | 2/1965 | Wanderer | 222—541 X |
| 3,254,811 | 6/1966 | Harris | 222—541 |

RAPHAEL M. LUPO, *Primary Examiner.*